(12) United States Patent
Autrey et al.

(10) Patent No.: US 7,316,788 B2
(45) Date of Patent: Jan. 8, 2008

(54) MATERIALS FOR STORAGE AND RELEASE OF HYDROGEN AND METHODS FOR PREPARING AND USING SAME

(75) Inventors: Thomas S. Autrey, West Richland, WA (US); Anna Gutowska, Richland, WA (US); Yongsoon Shin, Richland, WA (US); Liyu Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 191 days.

(21) Appl. No.: 10/778,997

(22) Filed: Feb. 12, 2004

(65) Prior Publication Data

US 2005/0180916 A1 Aug. 18, 2005

(51) Int. Cl.
*C09K 3/00* (2006.01)
*C01B 3/02* (2006.01)
*C01B 3/04* (2006.01)
*H01M 8/18* (2006.01)

(52) U.S. Cl. .......................... 252/182.34; 252/182.32; 252/182.35; 423/644; 423/645; 423/646; 423/647; 423/648.1; 429/19

(58) Field of Classification Search ............... 423/644, 423/645, 646, 647, 648.1; 429/19; 252/182.32, 252/182.34, 182.35
See application file for complete search history.

(56) References Cited

U.S. PATENT DOCUMENTS

| | | | |
|---|---|---|---|
| 4,383,837 A * | 5/1983 | Smith | ....................... 48/197 R |
| 4,433,063 A | 2/1984 | Bernstein et al. | |
| 4,507,263 A * | 3/1985 | Ron | ............................. 419/48 |
| 4,716,736 A | 1/1988 | Schwarz | |
| 5,653,951 A * | 8/1997 | Rodriguez et al. | .......... 423/439 |
| 6,589,312 B1 | 7/2003 | Snow | |
| 2004/0077485 A1* | 4/2004 | Purta et al. | ................. 502/100 |

OTHER PUBLICATIONS

Gutowska, et al. Chemical Hydrogen Storage in Nano-Structured Material, . . . Prepr.Pap-Am Chem Soc. Div. Fuel Chem 2004, 49, (1), 150, no month.
V. Sit, et al, The Thermal Dissociation of NH3BH3, Thermochimica Acta, 113 (1987) 379-382, no month.
Hydrogen, Fuel Cells & Infrastructure Technologies Program, Program Overview, Annual Program Review, May 19-22, 2003, Berkeley, CA.
Baitalow et al., Thermochim Acta, 391, p. 159-168, 2002, no month.
Jaska et al., Journal of the American Chemical Society, 125, p. 9424-9424, 2003, no month.
Wideman et al., Convenient Procedures for the Laboratory Preparation of Borazine, Inorganic Chemistry, 24, p. 1002-1003, 1995, no month.
Raissi et al., Hydrogen Storage in Ammonia and Aminoborane Complexes, Hydrogen Program Annual Review, May 21, 2002.

(Continued)

*Primary Examiner*—Wayne A. Langel
(74) *Attorney, Agent, or Firm*—James D. Matheson

(57) ABSTRACT

The invention relates to materials for storing and releasing hydrogen and methods for preparing and using same. The materials exhibit fast release rates at low release temperatures and are suitable as fuel and/or hydrogen sources for a variety of applications such as automobile engines.

10 Claims, 6 Drawing Sheets

OTHER PUBLICATIONS

Zhao et al., Triblock Copolymer Syntheses of Mesoporous Silica with Periodic 50 to 300 Angstrom Pores, Science, 279, vol. 279, pp. 548-552, Jan. 1998.

Zhao et al., Nonionic Triblock and Star Diblock Copolymer and Oligomeric Surfactant Syntheses of . . . , Journal of the American Chemical Society, 120, pp. 6024-6036, Jun. 1998.

Wolf et al., Calorimetric process monitoring of thermal decomposition of B-N-H compounds, Thermochim Acta, 343, 2002, pp. 19-25, no month.

Andreas Zuttel, Materials for hydrogen storage, Materialstoday, Sep. 2003, pp. 24-33.

Dr. rer.nat., (non-English) Dissertation, Sep. 29, 1972, pp. 1-130.

* cited by examiner

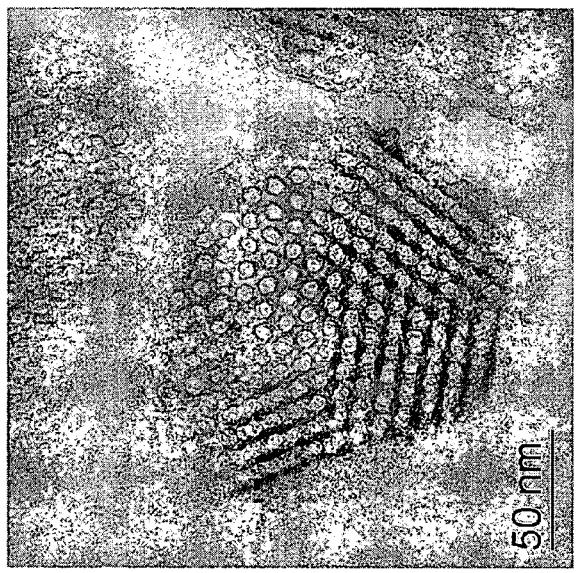
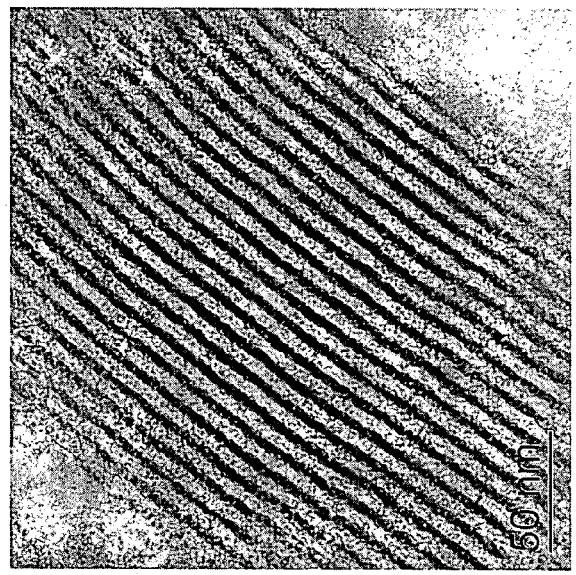
Fig. 1a
Fig. 1b
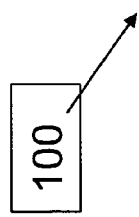

MATERIALS FOR STORAGE AND RELEASE OF HYDROGEN AND METHODS FOR PREPARING AND USING SAME

This invention was made with Government support under Contract DE-AC0676RLO-1830 awarded by the U.S. Department of Energy. The Government has certain rights in the invention.

BACKGROUND OF THE INVENTION (1) Field of the Invention

The present invention generally relates to materials and processes for storing hydrogen, and uses thereof. More particularly, the present invention relates to compounds, materials, and material combinations having a greater capacity for both storing hydrogen and for releasing hydrogen at lower release temperatures and faster release rates, for applications both on-board and off-board.

(2) Description of Related Art

The Department of Energy (DOE) issued a challenge for hydrogen storage related technologies during 2003 to compliment existing programs on Hydrogen Production and Fuel Cell development. Part of the challenge involved proposed project milestones in calendar years 2010 and 2015 for the development of new materials and technologies relating to storing hydrogen for use as vehicle energy sources. Four technologies for storing hydrogen are under investigation in the technical art: (1) storage as simple metal hydrides, e.g., $MgH_2$, (2) storage on carbon materials, including single-walled carbon nanotubes, (3) storage as complex metal hydrides, e.g., $NaAlH_4$, and (4) chemical hydrogen storage, e.g. $NH_xBH_x$, where x=1 to 4. The technical developments related to chemical hydrogen storage technology are discussed further hereafter.

Baitalow et al. have shown the potential for use of N—B—H compounds including ammonia borane, $NH_3BH_3$, (AB) as a hydrogen storage material. Jaska et al. report hydrogen formation in AB is likely to occur by an intermolecular dimerization pathway as shown in reaction (1), although a two-step mechanism, as shown in reactions (2) and (3), is not ruled out:

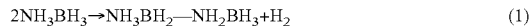  (1)

  (2)

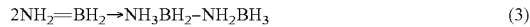  (3)

Each step that forms a new B—N bond also forms hydrogen, as illustrated in reactions (4) and (5):

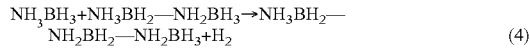  (4)

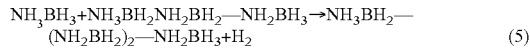  (5)

Baitalow et al. further report that at temperatures >150° C., additional hydrogen may be released, as illustrated in reactions (6) and (7):

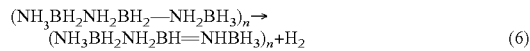  (6)

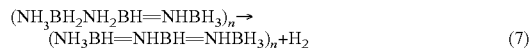  (7)

However, it is well known in the art that release of hydrogen from bulk or neat AB occurs at temperatures at which undesirable side reactions occur thereby generating products that contaminate and decrease the purity of the released hydrogen available as fuel. For example, the formation of cyclic borazine, $c\text{-}(NHBH)_3$, an inorganic analog of benzene, is one such contaminating product reported by Wideman et al., illustrated in reaction (8):

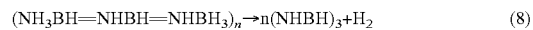  (8)

Raissi et al. have reviewed data for hydrogen release from the neat or bulk solid AB. The reaction of $NH_3BH_3$ to yield $NH_3(BH_2\text{—}NH_2)_nBH_3$+free $nH_2$, releases hydrogen at temperatures near 115° C. in reactions that are comparatively slow and that again have a high potential for forming borazine. At even moderate reaction temperatures, e.g., >150° C., borazine yields are significant. Borazine is damaging to fuel cells. Thus, its presence means the purity of released hydrogen remains questionable and thus unsuitable for use.

As the current state of the art shows, use of AB materials remains problematic due to 1) relatively high reaction temperatures required for hydrogen release, 2) slow rates for release, and 3) presence of reaction products like borazine that contaminate the hydrogen released from the source materials complicating their use as a fuel source.

Accordingly, there remains a need to 1) decrease the temperatures under which hydrogen is released so as to meet proposed guidelines for fuel storage and use, 2) improve the rates for hydrogen release, and/or 3) minimize unwanted side reactions that generate undesirable and contaminating products thereby increasing the purity of hydrogen available as fuel.

SUMMARY OF THE INVENTION

It is an object of the present invention to provide materials, material combinations, and/or compositions for storing and releasing hydrogen that decrease the temperatures and improve the rates for hydrogen release thus meeting the objectives for provision of hydrogen sources for next-generation fuel source applications. It is still further an object of the present invention to control reactivity so as to minimize undesirable reaction products that contaminate the released hydrogen from hydrogen storage materials, thereby increasing the purity of released hydrogen available as fuel. Materials of the present invention provide greater capacities for storage and release of hydrogen in a pure state, at both lower temperatures and faster rates, and thus have the potential to serve numerous industrial applications wherein high hydrogen storage and usage demands may be met, including, but not limited to, next generation fuel cells and hydrogen sources, applicable to uses in the automobile industry and elsewhere.

The material for storing and releasing hydrogen of the present invention comprises 1) a support comprising a high surface area material that is 2) combined with at least one compound capable of storing and releasing hydrogen such that when combined with the support is capable of releasing hydrogen at a greater rate and a lower temperature relative to the bulk or neat compound(s).

The term "high surface area" as used herein means a surface area of at least 50 $m^2/g$. The term "support" means a high surface area material formulated, structured, formed, or configured to support a bulk hydrogen storage material. The support materials of the present invention, for example, serve as substrates whereby a bulk quantity of hydrogen storing and releasing material is deposited, impregnated, coated, and/or polymerized thereon at correct weight ratios.

The material for storing and releasing hydrogen currently and preferably comprises a member selected from the group of N—B—H compounds, including, but not limited to, ammonia borane (AB) that when deposited onto a support or scaffolding material, the composition exhibits unique and useful properties for storing and releasing hydrogen. Other materials suitable for hydrogen storing and releasing compounds or materials comprise the group of chemical hydrides, complex hydrides, metal hydrides, polymers, conducting polymers, and nitrogen boron compounds, boron nitride, carbon materials, and combinations thereof.

Support materials include, but are not limited to, members selected from the group of porous materials, interconnected materials, non-interconnected materials, channeled materials, aerogels, aerogel materials, polymer materials, porous polymer materials, nonporous materials, mesoporous materials, zeolites, zeolite materials, silica, silicon dioxide, mesoporous silica, titanium dioxide, mesoporous titanium dioxide, carbon materials, mesoporous carbon materials, and combinations thereof.

The method of preparing the hydrogen storage materials of the instant invention comprises the steps: 1) providing a support composed of a high surface area material, and 2) combining the support with at least one compound capable of storing and releasing hydrogen, wherein the compound(s) when deposited on the support releases hydrogen at a greater rate and a lower temperature relative to the bulk or neat material. The term "combining" as used herein describes various chemical and physical processes, including, but not limited to, impregnating, depositing, layering, coating, physisorbing, chemisorbing, mixing, wetting, polymerizing, chemically bonding, and combinations thereof. The resulting composite material for storing and releasing hydrogen may be adapted for both on-board and off-board applications, including but not limited to, on-board devices, off-board devices, hydrogen generators, fuel sources and components, components in solid oxide fuel cells, as well as constituents and/or components in/for engines, including, but not limited to, vehicle engines, combustion engines, automobile engines, and the like.

BRIEF DESCRIPTION OF THE DRAWINGS

A more complete appreciation of the invention will be readily obtained by reference to the following description of the accompanying drawings in which like numerals in different figures represent the same structures or elements.

FIG. 1A shows a high resolution transmission electron microscope (HRTEM) cross-sectional view of a porous templated silicate structure, i.e., SBA-15, used in conjunction with a first embodiment of the present invention.

FIG. 1B shows a HRTEM transverse view of a porous templated silicate structure, i.e., SBA-15, used in conjunction with a first embodiment of the present invention.

DETAILED DESCRIPTION OF THE INVENTION

Figure 2:
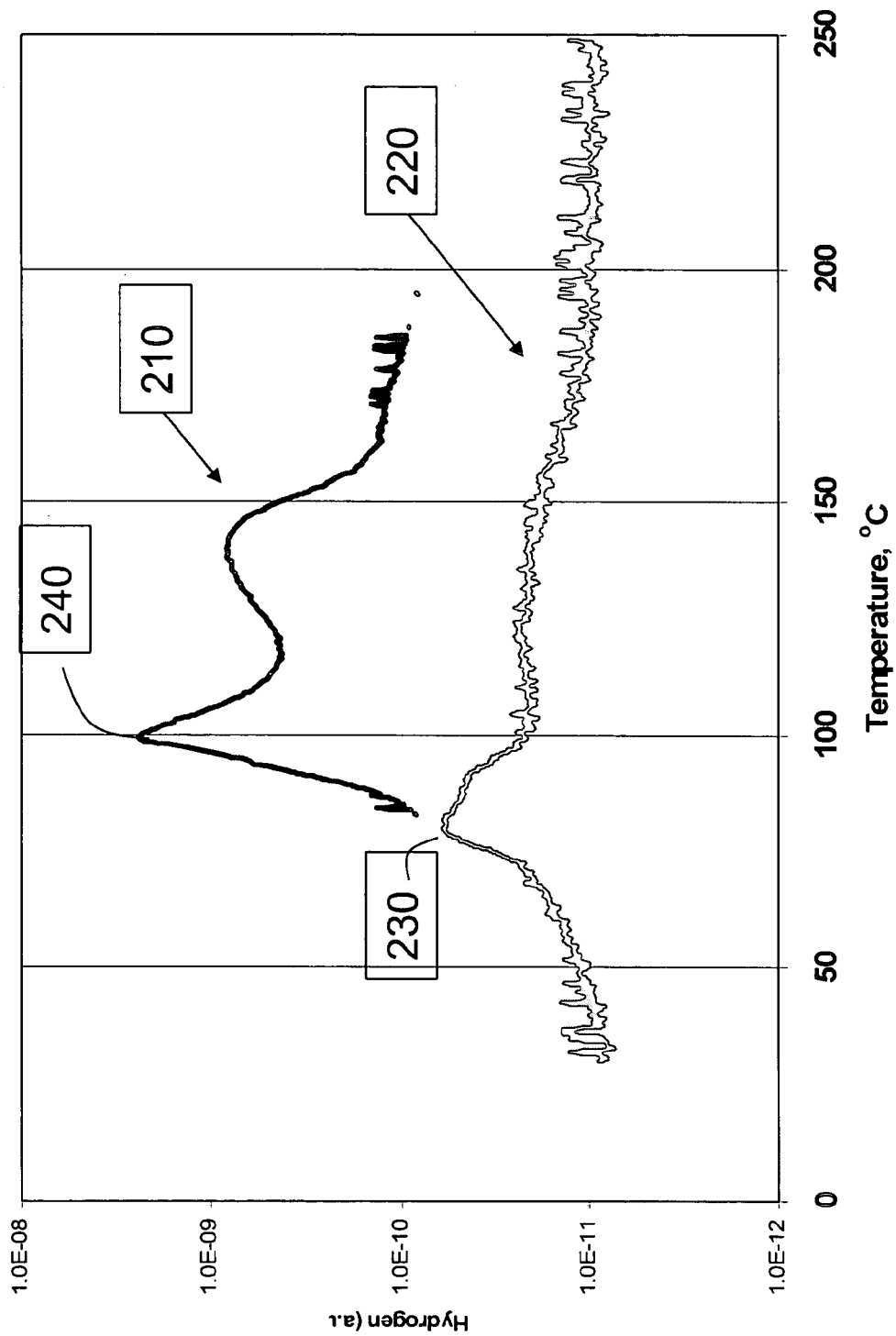
FIG. 2 illustrates the unique temperature profile for release of hydrogen from a 1:1 AB:SBA-15 composite according to a first embodiment of the present invention compared to neat AB.

While the present invention is described herein with reference to the preferred embodiments thereof, it should be understood that the invention is not limited thereto, and various alternatives in form and detail may be made therein without departing from the spirit and scope of the invention. In particular, those skilled in the art will appreciate that materials described herein for hydrogen storage/release, as well as related moieties, like chemical products and/or intermediates can be applied to numerous template or support substrates, both of a porous or nonporous nature. The term "pores" as the term is used in describing porous materials include, but are not limited to, interconnected, non-interconnected, ordered, non-ordered, channels, configurations, features, designs, and combinations thereof. For example, a macroscale support material comprising a plurality of nanoscale features, nanoscale channels, or nanoscale pores. The term "pore" further embodies and encompasses all shapes, including, but not limited to, round and square. Other embodiments for pore, channel, and feature configurations as would be envisioned by a person of ordinary skill in the art are hereby incorporated, as well as the associated material manufacturing and/or application methods. Thus, no limitation in intended by the disclosure of the preferred embodiments.

The support 100 of the present invention is preferably selected from the group consisting of high surface area materials, including both porous and non-porous materials, and combinations thereof. FIG. 1 shows a support 100 material according to a first embodiment of the present invention, comprising a macroscale silica template material, SBA-15 (SBA). The term "template" as used herein describes support materials on which the hydrogen storing and releasing materials of the present invention are impregnated, deposited, coated, chemi-sorbed, physi-sorbed, and/or chemically bound in a fashion corresponding to the nature of the surfaces (both interior and exterior) of the substrate thereby contouring, mimicking, and/or mirroring the detail or pore structure of the substrate surface on which it is deposited or in chemical communication with. Porous silica templates have an extremely high surface area and a highly ordered pore structure, as reported by Zhao et al. Silica ($SiO_2$) is a preferred support for the template reactions of the present invention by virtue of the pore structure.

FIG. 1a and FIG. 1b show high resolution transmission electron microscope (HRTEM) images of the support 100 in cross-section and transverse views, respectively. The support 100 comprises a plurality of pores or channels. The pores of the support materials of the present invention are preferably in the range from about 2 angstroms (Å) to about 1000 micrometers (μm). More preferably, pores of the support materials of the present invention range from about 2 nanometers (nm) to about 100 μm. Suitable alternative materials for the support 100 include porous carbon and/or porous titanium dioxide ($TiO_2$), including. e.g., mesoporous carbon and/or mesoporous titanium dioxide. "Mesoporous" as used herein means pores of a size in the range from about 2 nm to about 0.05 μm. The support 100 may be further formulated in a variety of shapes or particle configurations specific to the intended application. For example, the support may be comprised of, e.g., nanoparticles, nanospheres, colloidal particles, and combinations or variants thereof. Particles in these embodiments are preferably of a size in the range from about 1 nm to about 10 μm.

The support 100 is combined with at least one compound having a high weight or volume ratio density of hydrogen, although more than one compound can be envisioned. Materials for storing and releasing hydrogen preferably comprise at least one element selected from the group consisting of Li, Be, B, C, N, O, Na, Mg, Al, Si, P, S, or combinations thereof. More preferably, materials for storing and releasing hydrogen are selected from the group of $NH_xBH_x$ compounds where x is in the range from about 1 to 4, ammonia borane ($NH_3BH_3$) being representative, but not exclusive. For example, metal hydrides, complex hydrides, other chemical hydrogen storage materials (e.g., ammonia, $NH_3$), and/or mixtures thereof can be envisioned. Combining the support 100 and the compound(s) having a high weight percentage of hydrogen produces a material exhibiting the uncharacteristic properties of a faster release rate and a lower release temperature for hydrogen relative to the bulk or neat materials themselves.

Ammonia borane (AB) as a hydrogen storing and releasing material in the instant case is preferably deposited or fashioned at thicknesses whereby the AB hydrogen storage and releasing material is combined at a 1:1 weight ratio with the support 100 or scaffolding substrate thereby yielding a 1:1 composite material, e.g., 1:1 AB:SBA-15, but is not limited thereto. For example, other weight ratios between the AB hydrogen storing and releasing material and the SBA support 100 are easily accommodated. For example, AB:SBA weight ratios of 1:2, 1:3, and greater, or alternatively AB:SBA weight ratios of 2:1, 3:1 and greater may be deployed to maximize hydrogen storage and release. Choices for consideration as would be envisioned by a person of ordinary skill in the art are hereby incorporated.

Porous materials where used as the support 100 or template material 100 preferably comprise at least about 20% porosity by volume. The high surface area support material is preferably selected from the group consisting of porous nanoparticles, porous coated nanoparticles, and combinations thereof. Porous coated nanoparticles may be selected from the group consisting of externally coated, internally coated, both externally/internally coated, internally filled, internally filled/externally coated, and combinations thereof.

Non-porous materials may be used as supports or scaffold materials and are preferably selected from the group of non-porous nanoparticles, externally coated non-porous nanoparticles, and combinations thereof. Examples of a non-porous support include, but are not limited to, a composite comprising nanoscale features or channels, e.g., non-porous nanoparticles and/or non-porous nanospheres.

It should be noted that to further enhance the kinetics or thermodynamics for hydrogen release and uptake, catalysts and catalyst like materials may be added to the support(s), hydrogen storage material(s), or the combined support/hydrogen storage composites. For example, adding a transition metal catalyst and/or a carbon material to the composite. Catalysts as would be envisioned or deployed by a person of ordinary skill in the art are hereby incorporated.

Solvent choices for preparing the materials of the present invention are meriad, including liquids or supercritical fluids of water, ammonia, and carbon dioxide. Other solvent selections include hydrocarbon and organic solvents such as methanol, ethanol, and diethyl-ether. Methanol is a preferred solvent for dissolution and deposition of the hydrogen storing and releasing material due to its rapid drying whereby the AB material is quickly and efficiently combined, deposited and/or bonded to the support. Other similarly volatile and/or fast drying solvents may be selected. Thus, no limitation in the selection of applicable solvents is hereby intended by the disclosure of the preferred solvent.

The following examples are intended to promote a further understanding of the present invention. Example 1 details the preparation of a 1:1 AB:SBA-15 composite material, according to a first embodiment of the present invention, and compares hydrogen release temperatures relative to the neat or bulk AB material. Examples 1-4 describe and compare others properties of the AB:SBA-15 composite material and a second embodiment composite material of the present invention relative to the neat or bulk AB material.

EXAMPLE 1

In a first embodiment of the present invention, hydrogen release temperatures for a 1:1 AB:SBA-15 composite were compared to release for the neat and/or bulk AB material.

Experimental. A support 100, SBA-15, comprising mesoporous silica with a plurality of hexagonally ordered nanoscale pore channels was prepared as described by Zhao et al., incorporated in its entirety herein. In a typical preparation of SBA-15, 12.0 g of non-ionic surfactant comprising ethylene oxide/propylene oxide block copolymer (MW=approx. 5,800) sold commercially under the trade name Pluronic® P-123 non-ionic surfactant (BASF Corp., Mount Olive, N.J.) was dissolved in 360 mL of 2M HCl solution at 40° C. 25.5 g of 98% tetra-ethyl-ortho-silicate (TEOS), available commercially (Sigma-Aldrich Corp., St. Louis, Mo.), was added to the milky solution and stirred for 18 hours at the same temperature. The mixture was transferred into a teflon-lined autoclave and heated to 100° C. for 24 hours without stirring. The white precipitate was filtered, dried in air, and calcined at 550° C. for 6 hours. Thin sections of the resultant support specimen were subjected to high resolution transmission electron microscopy (HRTEM) observation, prepared by standard epoxy embedding followed by ultra-microtoming, e.g., slicing, to a thickness of 50 nm or less. The support material 100 was found to have an average particle size of from 100-200 μm, an average surface area of approximately 1000 $m^2/g$, and a pore and/or channel diameter starting at about 3 nm.

The hydrogen storing and releasing material, ammonia borane (AB), was prepared for use in combination with the support 100 as follows. 90% technical grade AB (Sigma-Aldrich Corp., St. Louis, Mo.) was purified by recrystallization from diethyl ether, followed by washing with ethanol to remove polymeric and borate impurities, thereby yielding >99% pure $NH_3BH_3$, as shown by $^{11}B$ Nuclear Magnetic Resonance (NMR) imaging.

Deposition and/or coating of the purified AB to the support 100 was done as follows. 50 mg of purified AB was dissolved in 0.3 mL methanol after which a 50 mg sample of the SBA-15 support material 100 was wetted with the methanolic solution. Given the porous nature of the support 1.00, capillary action rapidly filled the internal channels and pores of the mesoporous template material. The 'wet' SBA-15 was dried under vacuum to remove the methanol solvent, yielding a AB:SBA composite material having a 1:1 weight ratio of AB to SBA-15 in the composite. Clumping of the solid AB on the template can be expected if the internal channels are not successfully coated. However, SEM images (not shown) of the SBA-15 material before and after coating with AB showed very similar features, and an absence of clumping.

HRTEM analyses were carried out on a Jeol JEM Model 2010 microscope (JEOL USA, Inc., 11 Dearborn Rd., Peabody, Mass., 01960) having a specified point-to-point resolution of 0.194 nm. The operating voltage on the microscope was 200 keV. All images were digitally recorded (image size 1024×1024 pixels) with a Gatan slow scan model 692-0100 camera system (Gatan, 5933 Coronado Lane, Pleasanton, Calif. 94588). Image processing was carried out using Digital Micrograph™ version 3.1 software (Gatan Inc., Pleasanton, Calif.). Differential Scanning Calorimetry (DSC) analyses of the neat AB material and the chemically combined AB:SBA-15 material were performed using a Netzsch STA 409 combination Thermal Gravimetric Analyzer (TGA) and Differential Scanning Calorimeter (DSC) (NETZSCH Instruments, Inc. 37North Ave. Burlington, Mass. 01803) or alternatively a Setaram C80 Calorimeter (Setaram, 7 rue de l'Oratoire 69300 Caluire, FR) in combination with a Pfeiffer QMS300 Mass Spectrometer (Pfeiffer Vacuum Ltd., 2-4 Cromwell Business Centre, Howard Way, Interchange Pk, Newport Pagnell, Bucks MK16 9QS, UK) equipped with a standard electron impact ionization detector. In the Netzsch equipment, a heated fused silica capillary (200° C.) was used to transfer the off gas from the TGA to the mass spectrometer (MS). A thermal temperature ramp of 1° C./min over a temperature range from room temperature to about 250° C. at an argon flow of 40-100 cc/min was used. The MS scanning rate was 12 seconds for a range of 1 to 100 amu.

Results. FIG. 2 compares the hydrogen release curves determined by mass spectrometric analysis for the neat AB 210 and AB:SBA-15 composite 220 as a function of DSC thermal decomposition temperature. DSC results show hydrogen was released for the 1:1 AB:SBA-15 material in the temperature range from about 25° C. to about 200 ° C. with a peak exotherm 230 for hydrogen release occurring at 79.4° C., well below the 100° C. objective. The neat AB 210 in comparison released hydrogen in the temperature range from 74° C. to 200° C. with the peak release exotherm 240 occuring at about 97.6° C. As shown in FIG. 2, release temperature in the composite 220 is reduced by a factor of about 23 percent compared to the neat material 210. If reaction (1) is the correct mechanistic pathway, then it follows that the dimerization reaction forms oligomers through subsequent bimolecular de-hydro-polymerization pathways. The result observed for the composite is especially attractive given that a fundamental requirement for on-board vehicle storage is the release of hydrogen at temperatures significantly below 100° C., an objective met by the AB:SBA composite in Example 1.

EXAMPLE 2

In a second embodiment of the present invention, AB:SBA-15 composites at weight ratios greater than 1:1 were used to compare hydrogen yields to the neat or bulk AB material. Expectation was that the hydrogen release temperatures would be reduced compared to the bulk material.

Experimental. Composite materials were prepared as in Example 1 at weight ratios for AB to SBA-15 of 2:1 and 3:1 and compared to results for both the 1:1 composite and the neat AB material.

Figure 3:
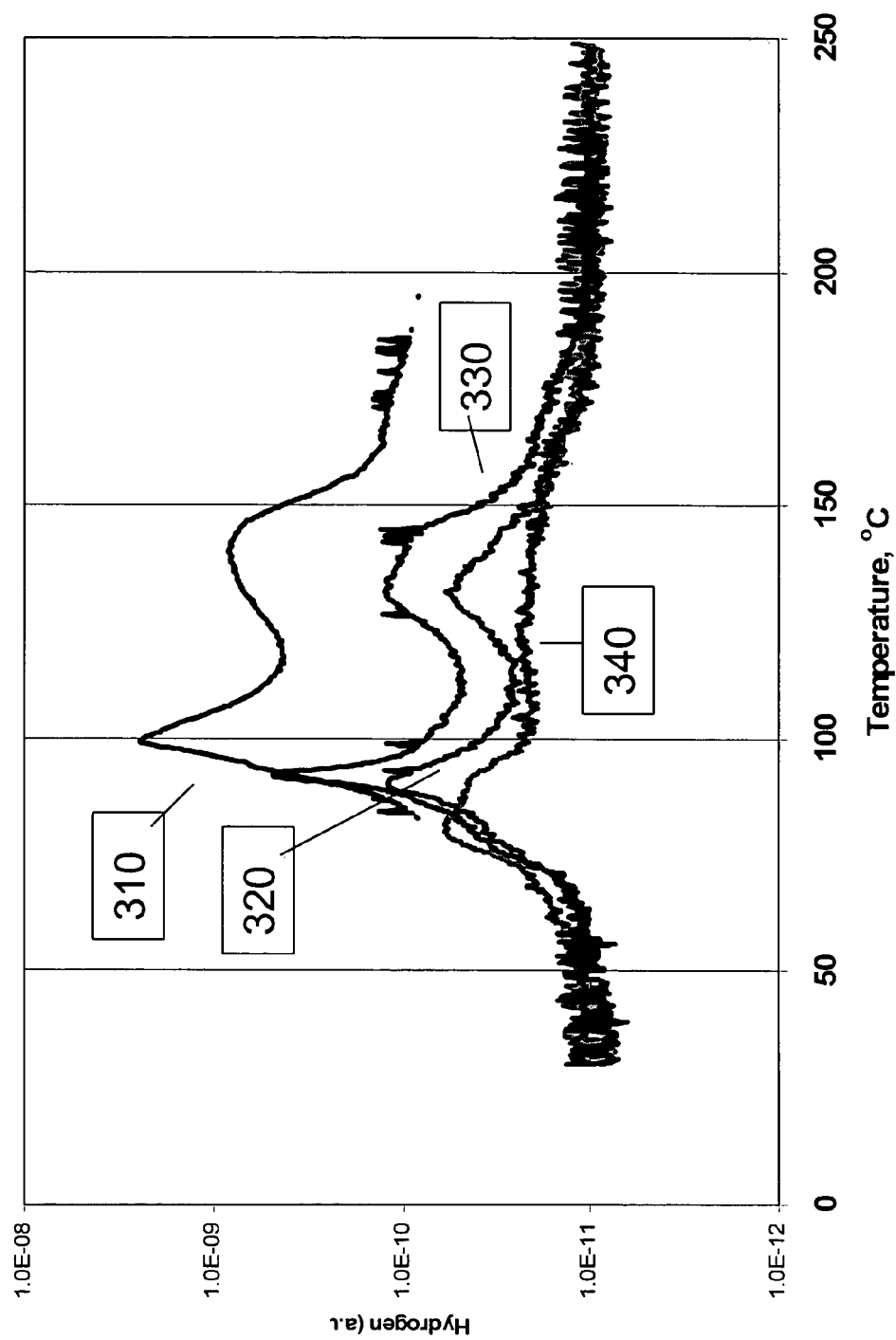
FIG. 3 presents mass-spectral data for hydrogen release as a function of DSC thermal decomposition temperature for a 1:1 AB:SBA-15 composite, a 2:1 AB:SBA-15 composite, and a 3:1 AB:SBA-15 composite according to a second embodiment of the present invention.

Results. FIG. 3 presents results comparing mass-spectral (MS) data for hydrogen release as a function of DSC thermal decomposition temperature for a 2:1 AB:SBA-15 composite 320 material and a 3:1 AB:SBA-15 composite 330 material relative to the 1:1 AB:SBA-15 composite 310 and neat. AB 320. In the figure, maximum exotherm temperatures for hydrogen release in the 2:1 composite 320 and the 3:1 composite 330 were 89.9° C. and 92.7° C., respectively. These compare with a release temperature for the 1:1 composite 310 of 79.4° C. and for the neat AB 320 of 97.6° C., respectively. Results show that while the hydrogen release temperatures for the greater weight ratio composites to be above those for the 1:1 composite 310, release temperatures for the 2:1 composite and 3:1 composite are still operable below the 100° C. benchmark, exhibiting temperature reductions for release of hydrogen of about 8% and about 5%, respectively, compared to the neat AB 320.

EXAMPLE 3 n order to achieve peak fuel performance, the cyclization reaction that forms borazine (FW=80.47), illustrated in reaction (8), must be minimized and the desired dehydrogenation reactions shown in reactions (6) and (7) optimized. Samples of the 1:1 AB:SBA-15 test material were used to test the hypothesis that the yield of borazine would be reduced in the 1:1 AB:SBA-15 test material when heated, compared to the neat or bulk AB material. If, as expected, the AB was coated on the inside of the mesoporous silica (e.g., SBA-15) template 100, the expectation was that the template 100 would minimize borazine formation by controlling linear polymer growth and minimizing the undesired cyclization reaction.

Experimental. Differential scanning calorimetry (DSC) experiments were conducted with concurrent collection of mass-spectral (MS) data to compare samples of neat AB material to test samples of 1:1 AB:SBA-15 material prepared as in Example 1. DSC scan temperature was from 20-200° C. at a scan rate of 5° C./min under an argon purge of 40 cc/min. Mass data were collected at mass numbers 2, 79, 80, and 81, corresponding to hydrogen (MS=2), to borazine (MS=80), and two daughters of borazine (MS=79 and 81), respectively.

Figure 4:
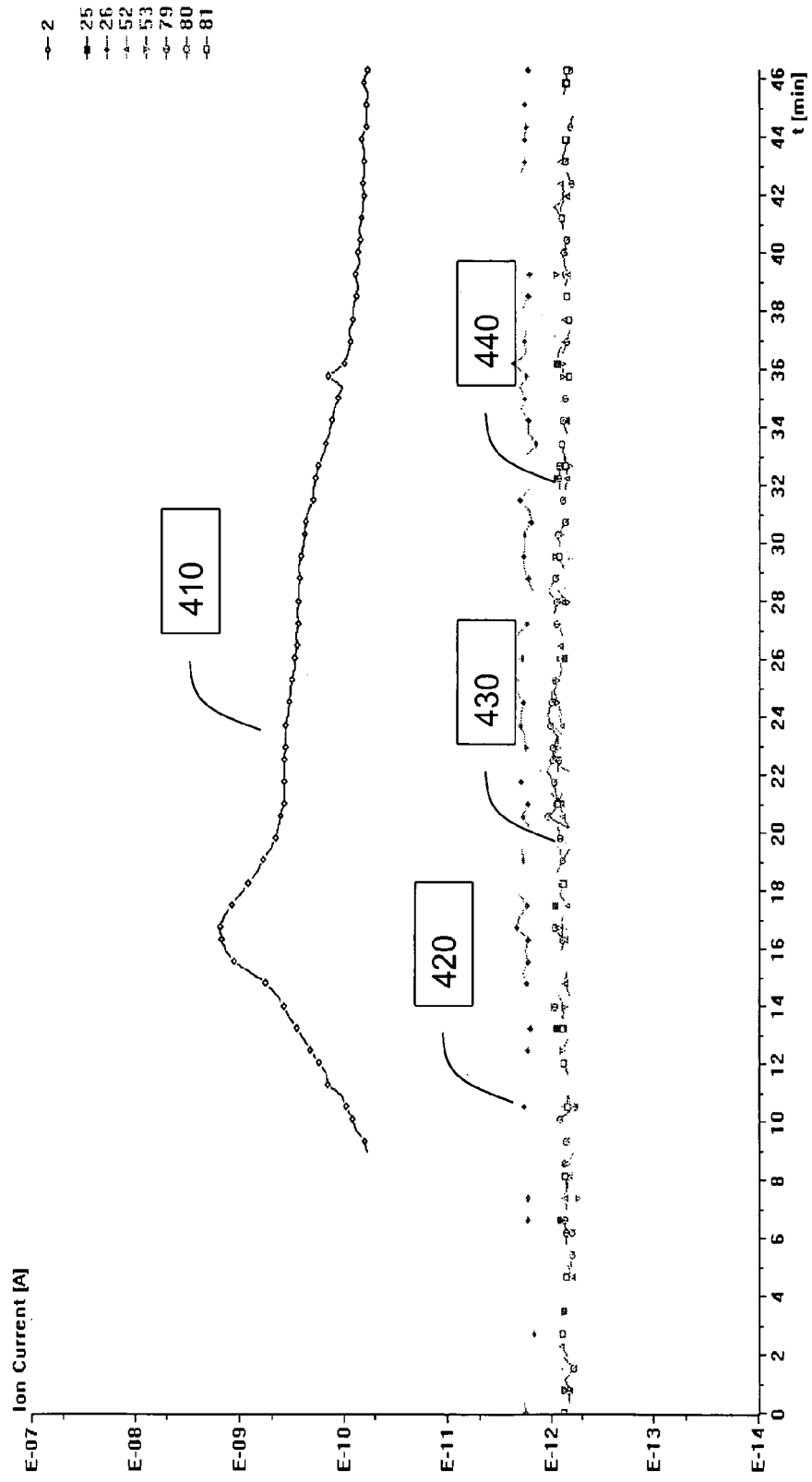
FIG. 4 presents mass-spectral data for release of hydrogen gas from a 1:1 AB:SBA-15 composite as a function of DSC thermal decomposition temperature showing a significantly low release temperature for hydrogen with an absence of contaminating reaction products.

Results. FIG. 4 presents results comparing mass-spectral (MS) data as a function of DSC thermal decomposition temperature for the 1:1 AB:SBA-15 material and the neat AB. In the figure, MS data curves are shown corresponding to mass numbers 2, 79, 80, 81 for hydrogen 410, borazine 420, and two borazine daughter products, curves 430 (m−1 daughter) and 440 (m+1 daughter), respectively.

Thermolysis of the AB material in the SBA-15 template (e.g., as 1:1 AB:SBA-15) shows two profound effects different than observed in the bulk thermal reaction. First, hydrogen is released from the AB in the support or template material at lower temperatures, e.g., below 100° C. Secondly, borazine is not detected or observed in the AB thermolysis from the mesoporous template SBA-15, in direct contrast with observations for the neat AB material that show borazine is formed during thermolysis of the bulk (e.g., unbound) and/or neat AB. Even at the reduced argon flow rates of 40 cc/minute, no borazine was detected, or was substantially below the detection limit of the mass detector. Further, hydrogen continues to be released from the composite effectively without the interference or presence of contaminating reaction products up to about 170° C., a temperature that routinely corresponds with borazine formation during heating of the neat AB. Results demonstrate that use of the AB:SBA-15 composite, including test cases with mesoporous silica templates 100 (e.g., SBA-15), can be used to control the reactivity of the dehydropolymerization chemistry of ammonia-borane (AB) to yield gaseous hydrogen.

Further, that the reactivity of the gaseous reactants in the present composite can be controlled has far-reaching implications. For example, it has been demonstrated that undesirable and/or contaminating gases can be contained or confined within the porous structure and that the desired gases can be released favorably and in a pure state. This means there is selective control of gaseous diffusion and release using the mesoporous substrates whereby various reactant gases can be successfully exploited to enhance control and reaction and release of desired gases or other end products relative to the undesirable ones. One may be able to show similar control of reactant gases, e.g., $NH_3$, reacted and/or released from other comparable composites or storage materials.

EXAMPLE 4

Rates for hydrogen release as a function of thermal decomposition temperature for the 1:1 AB:SBA-15 test material (prepared as detailed in Example 1) were compared to release rates for neat AB.

Experimental. DSC experiments were conducted on test samples of the 1:1 AB:SBA-15 composite material and neat AB material at several different isothermal temperatures, in the range from about 40° C. to about 60° C. The peak of the DSC curve corresponding to the peak of the hydrogen release from the first reaction step, e.g., AB→polymer+$H_2$ for the bulk AB material and the support material can be compared at other temperatures from the slope of the lines taken from plots of log $1/\tau_{1/2}$ (where $\tau_{1/2}$ is the half-life for hydrogen release in units of time) vs. $1/T$ (where T is the temperature) for the AB:SBA-15 compared to neat or bulk AB.

Figure 5:
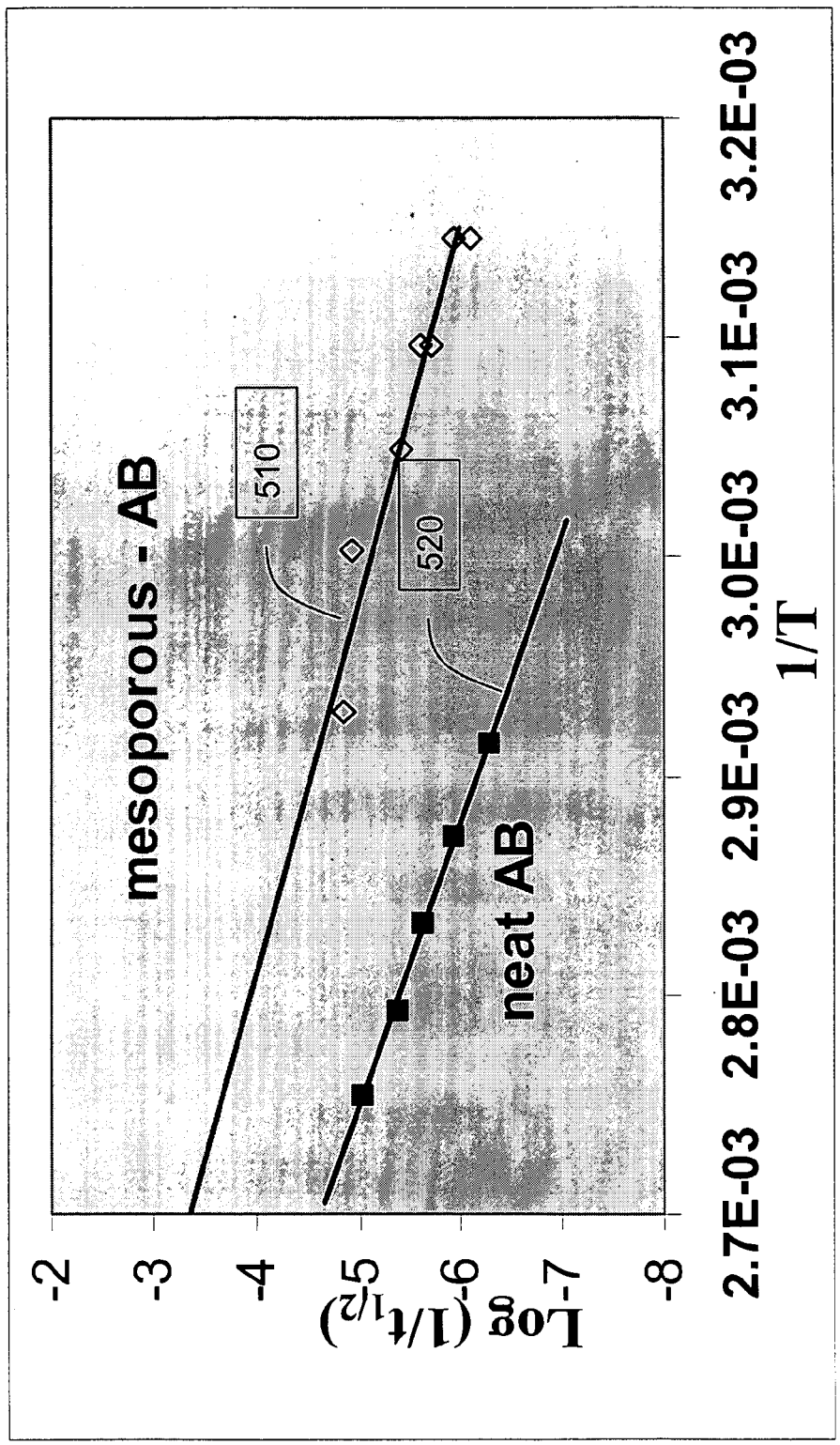
FIG. 5 presents rate data (log $1/\tau_{1/2}$ vs $1/T$) comparing release of hydrogen from a 1:1 AB:SBA-15 composite material of the present invention compared to neat AB.

Results. FIG. 5 compares instantaneous rate data for the thermal decomposition of AB in the 1:1 AB:SBA-15 composite 510 and for neat AB 520, as a function of hydrogen release temperature. The rate difference for hydrogen release between curves 510 and 520, as measured by the vertical displacement, is approximately two log units in the instant case, indicating the rate of hydrogen release from the 1:1 AB:SBA-15 composite 510 material compared to the neat AB 520 is up to 2 orders of magnitude greater than from the neat AB, or about 100 times faster. Even at 1 order of magnitude, a rate 10 times faster than the neat AB material would be expected. Further, the temperature differences noted for the 2:1 and 3:1 weight ratio composites mean these composites exhibit release rates greater than the neat or bulk material as well. Other configurations and/or ratios for the composite material(s) may be equally useful, e.g., 1:2 SBA, for example.

The person of ordinary skill will recognize that similar results may be expected using other composite support materials and/or material combinations. For example, composites comprising metal hydrides, or complex metal hydrides, as well as AB combined with other substrates. Thus, no limitations are intended by the disclosure of rate data for the 1:1 AB:SBA-15 composite.

EXAMPLE 5

In a third embodiment of the present invention, a 1:1 weight ratio composite was prepared between AB and silica ($SiO_2$) nano-spheres/nanoparticles, e.g., AB:$SiO_2$, prepared similarly as detailed in Example 1.

Experimental. DSC experiments were conducted and hydrogen release temperatures were measured by mass spectrometric analysis for the AB:$SiO_2$ composite. Results were then compared to data collected for 1:1 AB:SBA-15 and for neat AB.

Results. Hydrogen release exotherms for the 1:1 AB:$SiO_2$ composite were comparable to those observed for 1:1 AB:SBA-15, with a slightly higher temperature for release of hydrogen relative to the AB:SBA-15 material.

In general, the reduction in temperatures for hydrogen release in the hydrogen storing and releasing materials deposited on supports or scaffolds (e.g., SBA-15 and $SiO_2$ nanospheres, for example) appears to be a catalytic effect but may also be linked to differences in the curvature radii for the nano-scale templating materials. The various material combinations/composites with AB clearly show unexpected and notable differences in hydrogen release profiles relative to the neat AB alone.

EXAMPLE 6

In a fourth embodiment of the present invention, a 2:1 (e.g., 1.77:1) weight ratio composite between AB and another mesoporous silicate material, sold under the name MCM-41™ (Mobile Oil Corp., Fairfax, Va. 22037), was similarly prepared for use as detailed in Example 1. MCM-41 comprises arrays of non-intersecting hexagonal pore channels. The walls of the channels are amorphous $SiO_2$. The width of the channels can be controlled to be within about 2 to 10 nm. The exceptional porosity up to about 80% makes MCM-41 a useful support material as with other porous materials, including silicas, silica gels, aerogels, and/or zeolites.

Experimental. DSC experiments were conducted and hydrogen release temperatures were measured by mass spectrometric analysis for the 1.77:1 weight ratio AB:MCM-41 composite. Results were then compared to the neat AB.

Figure 6:
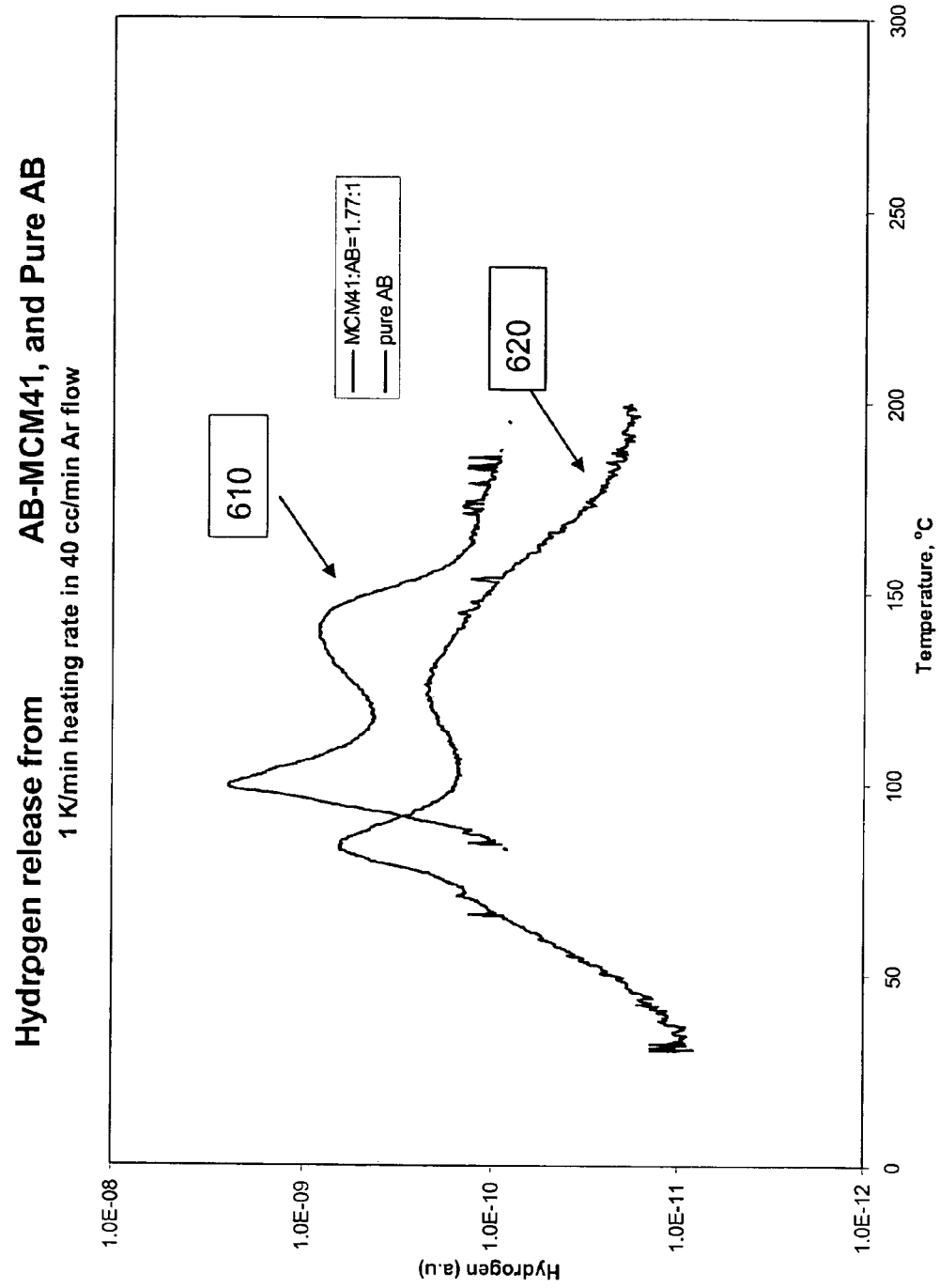
FIG. 6 presents mass-spectral data for hydrogen release as a function of DSC thermal decomposition temperature for a 1.77:1 AB:MCM-41 composite, according to a fourth embodiment of the present invention.

Results. FIG. 6 shows the hydrogen release exotherm for the 1.77:1 AB:MCM-41 composite 610 relative to the neat AB 620. As shown in FIG. 6, temperature for hydrogen release is again substantially reduced in the AB: MCM-41 composite 610, being about 81.9° C. as compared to the release temperature from the neat AB 620 at 97.6° C., a reduction in temperature by a factor of about 16% in the AB:MCM-41 composite 610 relative to the neat material 620. This result compares favorably with the release temperature observed for the AB:SBA-15 composites, and is most closely allied with the results obtained for the 2:1 AB:SBA-15 composite 330 in FIG. 3.

In general, the reduction in temperatures for hydrogen release in the hydrogen storing and releasing materials deposited on supports or scaffolds (e.g., SBA-15, $SiO_2$ nanospheres, and MCM-41) appears to be a catalytic effect but may also be linked to differences in the curvature radii for the nano-scale templating materials. The various material combinations/composites with AB clearly show unexpected and notable differences in hydrogen release profiles relative to the neat AB alone.

The properties of the materials of the present invention evidence their suitability for uses including, but not limited to, hydrogen storage, fuel generation, and fuel in advance of calendar year 2010 and calendar year 2015 objectives and milestone established by the Department of Energy. For example, materials of the present invention demonstrate a high storage capacity for hydrogen in the range up to and including about 24% by weight. Greater yields may be likely with various material combinations. In addition, results show hydrogen can be supplied at a significantly faster release rates and lower release and operating temperatures by simple heating of the dried solid state materials. Further, materials of the present invention exhibit controlled reactivity whereby the quantity of contaminating reaction products is minimized. Other advantages include low foaming observed during the degassing process, which factors into the size, configuration, and/or volume of the containment vessels which ultimately will house the eventual fuels for both onboard and offboard applications. Further, the materials exhibit excellent air and water stability. And, to date, all the reactions involved show a good rationale for reversibility, especially if combined using direct dehydrocoupling. These results suggest the present invention materials can be used or tailored for use in next generation fuel sources applicable to combustion engines, including automobile engines in advance of the 2010 and 2015 objectives for providing hydrogen fuels.

We claim:

1. A composition, comprising:
   a support comprising a high surface area material having a surface area of at least about 50 $m^2/g$ combined with at least one ammonia borane compound capable of storing and releasing hydrogen connected thereto, wherein said composition releases hydrogen at a greater rate and a lower temperature as compared to said at least one ammonia borane compound in a neat form not combined with said support.

2. The composition of claim 1, wherein said at least one ammonia borane compound is applied to said high surface area material through a method selected from the group consisting of impregnating, depositing, coating, mixing, layering, wetting, physisorbing, chemisorbing, chemically binding, polymerizing, and combinations thereof.

3. The composition of claim 1, wherein said high surface area material is selected from the group consisting of porous materials, non-porous materials, and combinations thereof.

4. The composition of claim 3, wherein said porous material is selected from the group consisting of interconnected porous materials, non-interconnected porous materials, channeled porous materials, porous silica, mesoporous silica, porous titanium dioxide, mesoporous titanium dioxide, porous carbon, mesoporous carbon, porous zeolites, porous aerogels, porous polymers, and combinations thereof.

5. The composition of claim 1, further comprising at least one compound comprising a member selected from the group consisting of Li, Be, B, C, N, 0, F, Na, Mg, Al, Si, and P.

6. The composition of claim 1, further comprising a catalyst.

7. The composition of claim 1, wherein hydrogen release takes place at a temperature below about 95° C.

8. The composition of claim 1, wherein hydrogen release takes place at a temperature below about 85° C.

9. The composition of claim 1, wherein said support comprises nanoparticles of a size in the range from about 1 nm to about 10 um.

10. The composition of claim 9, wherein said nanoparticles are coated.

* * * * *